Figure 1:
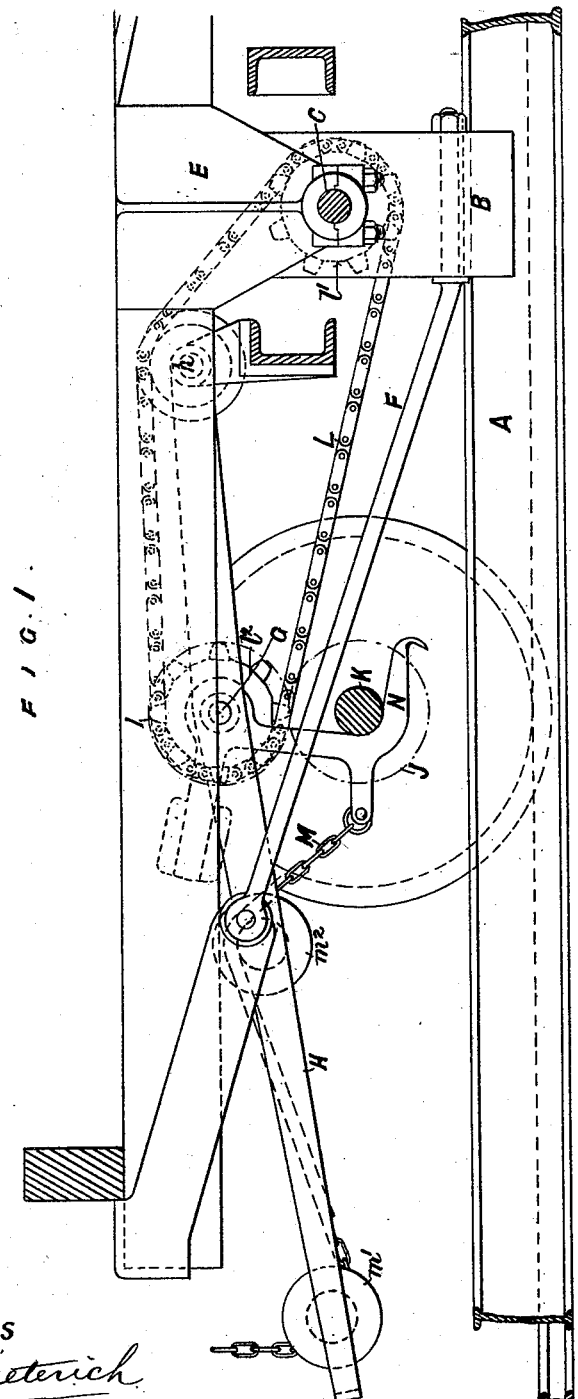

(No Model.)
2 Sheets—Sheet 1.

A. F. SMITH.
BRAKE FOR CARS.

No. 420,703. Patented Feb. 4, 1890.

WITNESSES
Fred G. Dieterich
Amos W. Hart

INVENTOR
Alexander F. Smith
BY Munn & Co
ATTORNEYS (No Model.)  2 Sheets—Sheet 2.
A. F. SMITH.
BRAKE FOR CARS.
No. 420,703. Patented Feb. 4, 1890.
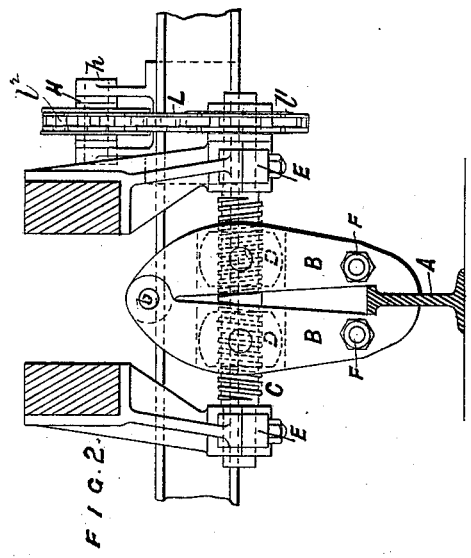
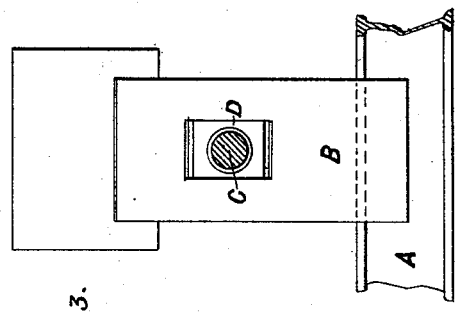
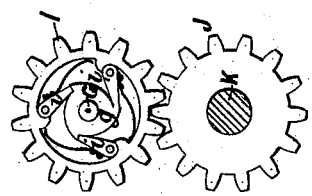
WITNESSES
Fred G. Dieterich
Amos W. Hart
INVENTOR
Alexander F. Smith
BY Munn & Co
ATTORNEYS

UNITED STATES PATENT OFFICE.

ALEXANDER FINDLAY SMITH, OF THE HAGUE, NETHERLANDS.

BRAKE FOR CARS.

SPECIFICATION forming part of Letters Patent No. 420,703, dated February 4, 1890.

Application filed November 1, 1889. Serial No. 328,913. (No model.)

*To all whom it may concern:*

Be it known that I, ALEXANDER FINDLAY SMITH, engineer, of 17 Surinamestraat, The Hague, in the Kingdom of Holland, have invented new and useful Improvements in Brakes for Cars, of which the following is a full, clear, and exact description.

My invention relates to an improved brake for cars worked by cable on inclined railways, tramways, and lifts; and it has for its object to provide a grip-brake capable of being brought into operation automatically or otherwise in the event of the cable breaking, the power necessary to produce the gripping action of the brake being derived from the descending motion of the car itself.

The improved brake comprises a pair of gripping-jaws adapted to clip a central rail, the said jaws being worked by a right and left handed screw-shaft operated from the wheel-axles, with which the screw-shaft is thrown into gear at the required moment by means of the mechanism hereinafter described with reference to the accompanying drawings, forming part of this specification, wherein—

Figure 1 is a longitudinal section, and Fig. 2 a transverse section, of the brake applied to a bogie-truck, of which there is one at each end of the carriage. Figs. 3 and 4 are details.

The same letters of reference indicate the same parts in all the figures.

A is the central rail, and B B a pair of jaws adapted to grip the said rail by their lower ends, and hinged together at their upper ends, as at *b*, the jaws being hung on a transverse right and left handed screw-shaft C, which works in nuts D, pivoted on lateral gudgeons in apertures in the radial members of the jaws, the shaft being hung in brackets E, fixed to the frame of the bogie and the jaws being stayed by rods F, anchored to the frame of the bogie. The screw-shaft C is geared by any suitable means with a short intermediate shaft G, carried by a lever H, pivoted on a center *h*, carried by the framing. Upon the shaft G is mounted loosely a gear-wheel I, and a similar wheel J is keyed on the wheel-axle K. The wheel I is connected to the shaft G through pawls *i*, pivoted to the rim of the wheel, and a ratchet-wheel *g*, fast on the shaft and contained in a cavity of the wheel, this pawl-and-ratchet gear admitting of the wheel I running idle, if geared with the axle K, during the ascent of the car, in order that the brake shall not then be applied.

The wheel I is put in gear at required times with the wheel J (for the purpose of operating the gripping-jaws B) by the motion of the lever H, supporting the intermediate shaft G, by which the wheel I is carried. The intermediate shaft G is geared with the screw-shaft C by any suitable mechanism—for instance, by an endless chain L, running on chain-wheels *l'* *l²*, respectively fast on the middle of the screw-shaft C and on the shaft G—so that on motion being communicated to the wheel I in the proper direction the screw-shaft will be operated and the gripping-jaws B closed on the rail A.

In the example illustrated the lever H is supposed to be held raised and the brake kept out of action by the conductor of the car; and for this purpose a chain M, leading from a convenient point within reach of the conductor, is passed under a sheave *m'* and over a second sheave *m²*, carried by the lever H, and is attached to a pendent hook N, pivoted loosely on the intermediate shaft G, the hook being adapted to engage under the wheel-axle K for the purpose of holding the wheels I J in gear when once engaged.

It will be obvious that the chain M, instead of being held by the conductor, might be attached to the cable itself, so that on the cable breaking the brake will be applied automatically. It will also be obvious that other equivalent means of transmitting motion may be substituted for the endless chain L.

The action of the apparatus is as follows: During the normal running of the car the chain M is drawn up by the conductor, the hook N is disengaged from the wheel-axle, and the lever H is raised, thus disengaging the wheel I from the wheel J. Should the cable break, the chain M, on being released, allows the lever H to fall by its own weight, thus bringing wheels I J into gear, in which position they are retained by the hook N engaging with the wheel-axle. By the running back of the car down the incline the rotation of the axle communicates rotary motion to the screw-shaft C through the wheels I J and chain L, whereby the jaws B are closed together and grip the rail A between them with a progressively-increasing force, so as to gradually arrest the motion of the car.

Having now particularly described and ascertained the nature of the said invention and in what manner the same is to be performed, I declare that what I claim is—

1. The herein-described grip-brake for railway-cars worked by cable haulage on steep inclines or inclined lifts, consisting of a pair of pendent jaws adapted to grip a central rail, in combination with a right and left handed screw-shaft screwing in and operating the jaws, and with mechanism, substantially as described, whereby the screw-shaft is at required times actuated from the wheel-axle for the purpose of closing the jaws, substantially as specified.

2. In the herein-described brake, the combination, with the pair of pendent gripping-jaws and with a right and left handed screw working the same, as described, of an intermediate shaft carried by a lever and geared by an endless chain or other mechanism with the jaw-operating screw, and of gear-wheels on the intermediate shaft and wheel-axle, respectively, adapted to be brought into engagement by the motion of said lever for the purpose of applying the brake, as specified.

3. In the herein-described brake, the combination, with the pendent gripping-jaws hinged together and worked by a right and left handed screw, an intermediate shaft carried by a lever geared with the jaw-operating screw and adapted to be geared at required times with a wheel-axle, as described, of a pendent hook pivoted to the lever and adapted to engage with the wheel-axle, so as to hold the intermediate shaft in gear therewith, substantially as specified.

4. In the herein-described brake, the combination, with the pendent gripping-jaws hinged together and worked by a right and left handed screw, an intermediate shaft carried by a lever geared with the jaw-operating screw and adapted to be geared at required times with a wheel-axle, as described, of a pendent hook pivoted to the lever and adapted to engage with the wheel-axle, and of a flexible connection attached to said hook and led over sheaves on the lever in such manner that the hook will be withdrawn from the axle and the intermediate shaft held out of gear therewith by the tension of such connection, substantially as specified.

The foregoing specification of my improvements in brakes for cars worked by cable on mountain and other inclined railways, tramways, and lifts signed by me this 11th day of October, 1889.

ALEXANDER FINDLAY SMITH.

Witnesses:
T. N. KENNARD,
*Clerk, 53 Chancery Lane, London.*
TOM FRANCIS BARNES,
*Notary's Clerk, 17 Gracechurch Street, London.*